United States Patent [19]
Russ et al.

[11] Patent Number: 5,713,539
[45] Date of Patent: Feb. 3, 1998

[54] APPARATUS FOR LOCKING AIRCRAFT CONTROLS

[76] Inventors: Richard T. Russ, 4117 NW. 144th, Oklahoma City, Okla. 73134; Thomas C. Williams, 11108 Coachman Rd., Yukon, Okla. 73099

[21] Appl. No.: 653,894

[22] Filed: May 28, 1996

[51] Int. Cl.⁶ .................................................. B64C 13/14
[52] U.S. Cl. ........................... 244/224; 70/200; 70/238
[58] Field of Search .......................... 244/224; 70/237, 70/198, 200, 203, 212, 238, 199

[56] References Cited

U.S. PATENT DOCUMENTS

| | | | |
|---|---|---|---|
| 1,531,062 | 3/1925 | Barravecchia . | |
| 2,035,231 | 3/1936 | Haberstro, Jr. | 244/1 |
| 3,169,731 | 2/1965 | Phillips et al. | 244/224 |
| 3,298,242 | 1/1967 | Smith | 74/495 |
| 3,330,504 | 7/1967 | Lewis | 244/83 |
| 3,690,131 | 9/1972 | Davis | 90/212 |
| 3,833,190 | 9/1974 | Gaio | 244/83 |
| 3,898,823 | 8/1975 | Ludeman | 70/200 |
| 4,208,026 | 6/1980 | Reynolds | 244/224 |
| 5,129,603 | 7/1992 | Wippler | 244/224 |
| 5,267,458 | 12/1993 | Heh | 70/238 |

FOREIGN PATENT DOCUMENTS

| | | | |
|---|---|---|---|
| 850440 | 8/1981 | U.S.S.R. | 70/238 |

OTHER PUBLICATIONS

Four catalog pages showing various types of locks for use on aircraft, source unknown, not dated.

*Primary Examiner*—Andres Kashnikow
*Assistant Examiner*—Tien Dinh
*Attorney, Agent, or Firm*—Dunlap & Codding, P.C.

[57] ABSTRACT

An apparatus and method for rigidly interlocking a control wheel and the rudder pedals of an aircraft is provided for securing the control surfaces of the aircraft operated by the control wheel and the rudder pedals in a stable position. The apparatus comprises a pair of control wheel retaining members rigidly connected to one end of a rod member in a spaced apart, parallel relationship with one another for retainingly engaging opposing radially extending portions of the control wheel and a pair of rudder pedal retaining members rigidly connected to one end of another rod member in a spaced apart, parallel relationship with one another for retainingly engaging a lever of each of the rudder pedals. The rod members are disposed in a telescoping relationship with respect to one another and are adjustably securable whereby the control wheel retaining members are rigidly locked in a selected position relative to the rudder pedal retaining members wherein the control wheel retaining members cooperate with the rudder pedal retaining members to secure the control wheel in a level position, the control column in an inward position, and the rudder pedals in a neutral or centered position.

16 Claims, 2 Drawing Sheets

APPARATUS FOR LOCKING AIRCRAFT CONTROLS

BACKGROUND OF THE INVENTION

1. Field of the Invention

The present invention relates generally to locking devices, and more particularly, but not by way of limitation, to an improved apparatus for securing an aircraft against theft and for securing the control surfaces of such aircraft against wind loads by rigidly interlocking the control wheel of the aircraft with rudder pedals of the aircraft.

2. Description of Related Art

Small aircraft conventionally employ two pedals for controlling the rudder of the aircraft and a control wheel for controlling the aileron and elevator control surfaces of the aircraft. When such aircraft are parked outside, the control surfaces are often subjected to high wind gusts. Gusts of wind can place significant loads on the rudder, the ailerons, and the elevators so as to cause them to flap and crash against their limit stops. Such flapping is undesirable in that it will prematurely wear or damage the control cables and the control linkages.

Additional damage can be incurred to the aircraft as a result of high winds passing over the control surfaces so as to cause all or portions of the aircraft to be lifted from the ground. For example, if the elevators are in an up position, a gust of wind passing over the tail will have a tendency to cause the tail of the aircraft to drop thereby causing the nose of the aircraft to be lifted. Such movement of the aircraft can cause excessive damage to the aircraft, as well as other aircraft parked nearby.

In an attempt to prevent wind damage to the control surfaces of aircraft, various devices have been employed for restricting the movement of the control surfaces when an aircraft is parked. Some of these devices are applied directly to the control surfaces. With the use of these types of devices, pilots have been known to forget to remove the devices before operating the aircraft thus creating a dangerous situation for the pilot. Furthermore, such devices are easily removed from the control surfaces, thus providing the aircraft with little, if any, protection against theft.

Other devices, in the form of elastic straps and cords, have been attached directly to the control wheel in an effort to restrain the movement of the control wheel, and in turn the ailerons and the elevators. Other devices have also been suggested which are attached to both the control wheel and the rudder pedals to restrain the movement of the control wheel and the rudder pedals, and thus the ailerons, the elevators, and the rudder. While such devices have experienced various degrees of success, many of these devices are designed to permit the control wheel, the control column, and the rudder pedals to move through a certain range of motion. As a result, a certain amount of control of the aircraft is still available whereby the aircraft can be taxied and thus stolen.

Other devices have been suggested which rigidly lock the control wheel and the rudder pedals to prevent the control surfaces from moving in gusts of wind. However, the construction and use of such devices results in the control surfaces being positioned in unstable positions, such as the elevators being angled upwardly so as to enable the nose of the aircraft to be lifted off of the ground. In addition, such devices are easily removed and thus do not provide theft deterrence.

To this end, a need has long existed for an improved apparatus for interlocking the control wheel and rudder pedals of an aircraft to secure the aircraft against theft and to secure the control surfaces of the aircraft against wind loads. It is to such an improved apparatus that the present invention is directed.

BRIEF DESCRIPTION OF THE DRAWINGS

FIG. 3 is a side view of the locking apparatus of the present invention shown secured to the control wheel and to the rudder pedals.

DETAILED DESCRIPTION

Figure 1:
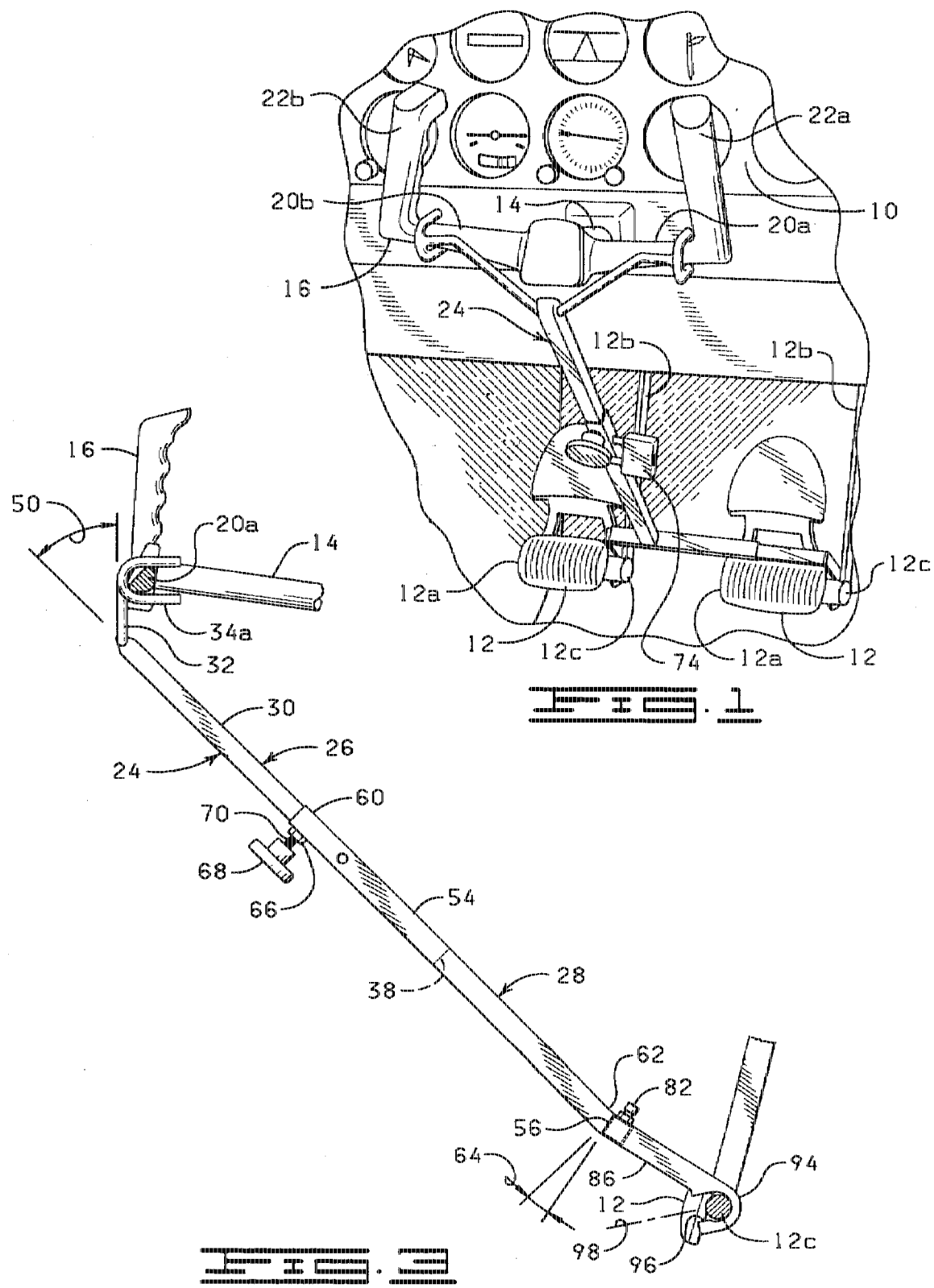
FIG. 1 is a perspective view of a portion of an aircraft control panel shown with a locking apparatus constructed in accordance with the present invention secured to the control wheel and the rudder pedals of the aircraft.

Referring now to the drawings, and more particularly to FIG. 1, shown is a portion of a typical aircraft control panel 10 and a pair of rudder pedals 12 of a typical lightweight aircraft. A control column 14 provided with a control wheel 16 is shown extending from the control panel 10. The control wheel 16 includes a cross member having radially extending portions 20a and 20b, and a pair of grip portions 22a and 22b extending from the ends of the cross member, respectively. The control wheel 16 facilitates movement of the control column 14 in an inward and outward direction to operate the elevators (not shown) and rotation of the control column 14 about a longitudinal axis of the control column 14 to operate the ailerons (not shown) between a level position, a right bank position, and a left bank position.

The rudder pedals 12 operate the rudder (not shown) and each rudder pedal 12 includes a plate member 12a supported by a lever 12b. In many aircraft, a portion 12c of the lever 12b extends laterally from one side of the plate member 12a. The rudder pedals 12 are operable, in a conventional manner, between a neutral or centered position wherein the rudder pedals 12 are in a side-by-side relationship, a right rudder position wherein the right rudder pedal is depressed inwardly relative to the left rudder pedal, and a left rudder position wherein the left rudder pedal is depressed inwardly relative to the right rudder pedal. The rudder pedals 12 may also be pivotable about the lower ends thereof by depressing the top end of the plate member 12a to set a parking brake, if provided.

The control wheel 16 and the rudder pedals 12 are shown in FIG. 1 to be rigidly interlocked with a locking apparatus 24 constructed in accordance with the present invention. The locking apparatus 24 is adapted to interlock the control wheel 16 and the rudder pedals 12 so that the control wheel 16 is retained in a level position wherein the right and left ailerons are substantially level with one another, the control column 14 is retained in an inward position (illustrated in FIG. 1), and the rudder pedals 12 are in a neutral or centered position. With the control wheel 16 secured in the level position, the control column 14 in the inward position, and the rudder pedals 12 in the neutral or centered position, the control surfaces of the aircraft are secured in positions wherein the control surfaces are minimally affected by wind gusts, and what effect the wind does have on the control surfaces, will tend to force the aircraft toward the ground rather than lift the aircraft from the ground which, as previously mentioned, can result in substantial damage to the aircraft, as well as nearby aircraft. More specifically, with the control column 14 in the inward position, the elevators are set in a downwardly angled position which will result in an upwardly directed force on the tail of the aircraft when a strong gust of wind passes over the tail. Such a force on the tail will in turn cause the nose of the aircraft to be forced downward so as to maintain the aircraft in stable contact with the ground.

The control wheel 16, the control column 14 and the rudder pedals 12 are conventional components of most small lightweight airplanes, and the operation of such components is well known to persons familiar with piloting such aircraft. Thus, no further description of such components or the operation of such components is believed necessary to enable one to fully understand the present invention which will now be described in detail.

Figure 2:
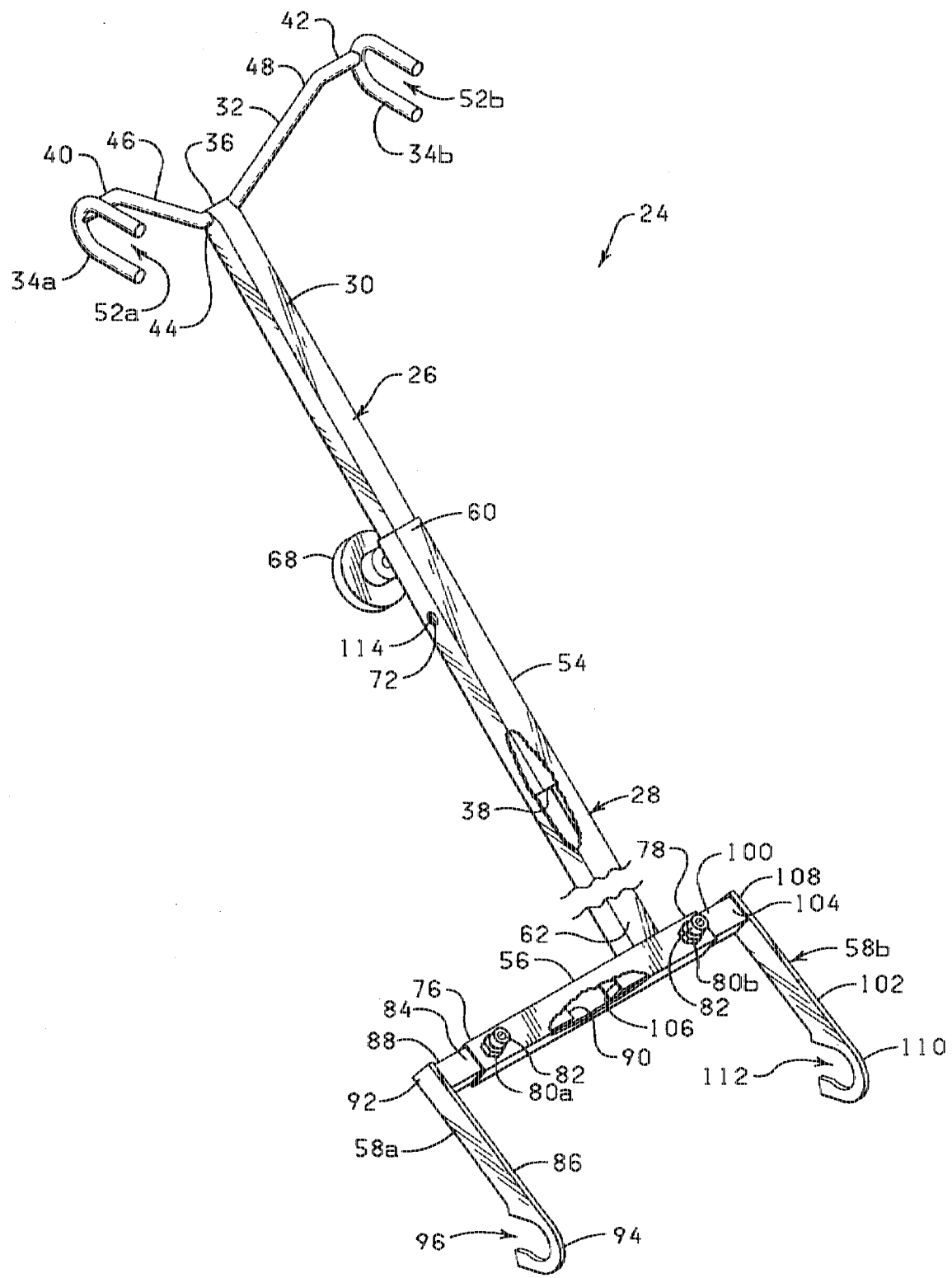
FIG. 2 is a partially cutaway, perspective view of the locking apparatus of the present invention.

Referring now to FIGS. 2 and 3, the locking apparatus 24 includes a control wheel support assembly 26 and a rudder pedal support assembly 28 disposed in a longitudinally adjustable, telescoping relationship with respect to one another whereby the control wheel support assembly 26 is rigidly lockable in a selected position relative to the rudder pedal support assembly 28 so that the control wheel support assembly 26 cooperates with the rudder pedal support assembly 28 to secure the control wheel 16 in the level position, the control column 14 in the inward position, and the rudder pedals 12 in the neutral or centered position.

The control wheel support assembly 26 includes an extension rod 30, a control wheel cross bar 32, and a pair of control wheel retaining members 34a and 34b. The extension rod 30 is an elongated member having a first end 36 and a second end 38. The extension rod 30 is preferably constructed of a square-shaped, steel tubing, but the extension rod 30 may be constructed of any rigid, high strength material preferably having a non-circular shape for reasons that will be explained below.

The control wheel cross bar 32 is characterized as having a first end portion 40, a second end portion 42, and a medial portion 44. The cross bar 32 is provided with a plurality of bends thereby forming a first leg 46 between the medial portion 44 and the first end portion 40 and a second leg 48 between the medial portion 44 and the second end portion 42 so that the first and second end portions 40 and 42 are offset from the medial portion 44 in a parallel relationship. Further, the bends of the cross bar 32 are oriented so that the medial portion 44, the first and second legs 46 and 48, and the first and second end portions 40 and 42 extend in a common plane.

The cross bar 32 is secured to the first end 36 of the extension rod 30 by disposing the medial portion 44 of the cross bar 32 in a slot (not shown) formed across the first end 36 of the extension rod 30 for receiving the cross bar 32 and then connecting the cross bar 32 to the extension rod 30 in a suitable manner, such as by welding. The cross bar 32 is secured to the extension rod 30 so that the first and second end portions 40 and 42 of the cross bar 32 extend outwardly from the first end 36 of the extension rod 30 and so that the cross bar 32 is angularly disposed relative to a longitudinal axis of the extension rod 30 at an angle 50 (FIG. 3). The angle 50 is shown herein to be about 45 degrees; however, it will be appreciated that the angle 50 may be varied to accommodate the particular shape and dimensions of the control wheel and the instrument panel of different aircraft.

The control wheel retaining members 34a and 34b are substantially U-shaped members, each defining a wheel receiving space 52a and 52b, respectively. The wheel receiving spaces 52a and 52b are sized to retainingly receive the radially extending portions 20a and 20b of the control wheel 16. The control wheel retaining member 34a is connected to the first end portion 40 of the cross bar 32, and the control wheel retaining member 34b is connected to the second end portion 42 of the cross bar 32 such that the control wheel retaining member 34a is in a spaced apart, parallel relationship with respect to the control wheel retaining member 34b for retaining opposing portions of the control wheel 16. The control wheel retaining members 34a and 34b are connected to the first and second end portions 40 and 42 of the cross bar 32, respectively, so that the control wheel retaining members 34a and 34b are normally disposed relative to the cross bar 32 with the open ends of the control wheel retaining members 34a and 34b oriented generally toward the second end 38 of the extension rod 30, as best shown in FIG. 3. To prevent damage to the control wheel 16, the control wheel retaining members 34a and 34b may be coated with a non-abrasive material, such as rubber or some other suitable material.

The rudder pedal support assembly 28 is adapted to be adjustably secured to the control wheel support assembly 26 and retainingly engage the laterally extending portions 12c of each of the rudder pedals 12. The rudder pedal support assembly 28 includes a support rod 54, a rudder cross bar 56, and a pair of rudder pedal retaining assemblies 58a and 58b. The support rod 54 is an elongated member characterized as having a first end 60 and a second end 62. The first end 60 of the support rod 54 is open and the support rod 54 is constructed of a square, steel tubing dimensioned to matingly receive the extension rod 30 of the control wheel support assembly 26 such that the extension rod 30 and the support rod 54 are disposed in a non-rotatable, telescoping relationship with one another. It will be appreciated that the support rod 54, like the extension rod 30, may be constructed of any suitable rigid and high strength material having a shape slidably matable with the extension rod 30. The second end of the support rod 54 is formed at an angle 64 (FIG. 3).

To permit the extension rod 30 to be adjustably set in a selected position relative to the support rod 54, the support rod 54 is provided with a threaded bore 66 through the sidewall thereof which is adapted to receive a clamp knob 68 having a threaded shaft 70 which is grippingly engagable with the side of the extension rod 30. The support rod 54 is also provided with a lock receiving opening 72 which extends across the support rod 54 and is dimensioned to receive a locking mechanism, such as a pad lock 74 as shown in FIG. 1.

The rudder cross bar 56 is constructed of a square, steel tubing so as to have a first open end 76 and a second open end 78. The rudder cross bar 56 is provided with a pair of threaded openings 80a and 80b, each positioned proximate the first and second open ends 76 and 78, respectively, for threadingly receiving a securing device, such as a cap screw 82.

The rudder cross bar 56 is connected to the second end 62 of the support rod 54 so that the rudder cross bar 56 is normally disposed relative to the support rod 54. In addition, because the rudder pedal support assembly 28 is configured to engage the laterally extending portions 12c of each of the rudder pedals 12, as opposed to the plates 12a thereof, and because the control wheel 16 and the control column 14 are generally aligned with a centerline of the plates 12a of the rudder pedals 12 while the laterally extending portions 12c of the rudder pedals 12 are laterally offset from the control wheel 16 and the control column 14, the rudder cross bar 56 is connected to the support rod 54 at a location on the rudder cross bar 56 located between the first end 76 and the second end 78 of the rudder cross bar 56 which is laterally offset from the center of the rudder cross bar 56. As best shown in FIG. 3, the angled configuration of the second end 62 of the support rod 54 facilitates the positioning of the rudder cross bar 56 in an angular relationship relative to the longitudinal axis of the support rod 54 when the rudder cross bar 56 is connected to the support rod 54. It will be appreciated that the angle 64 may be varied to accommodate the particular shape and dimensions of the control wheel and the instrument panel, as well as the relative position of the rudder pedals 12 to the control wheel and instrument panel of a particular aircraft.

The rudder pedal retaining assembly 58a includes an insert tube 84 and a rudder pedal retaining member 86. The insert tube 84 is constructed of a square tube sized so that the insert tube 84 is slidingly received in the first open end 76 of the rudder cross bar 56 in a telescoping relationship therewith. The insert tube 84 is characterized as having a first end 88 and a second end 90.

The rudder pedal retaining member 86 is constructed of a relatively flat steel bar having a first end 92 connected to the first end 88 of the insert tube 84 so that the rudder pedal retaining member 86 is normally disposed relative to the insert tube 84 and so that the rudder pedal retaining member 86 will extend upwardly from the longitudinal axis of the support rod 54 at the angle 64 when the rudder pedal retaining member 86 is disposed in the insert tube 84. The rudder pedal retaining member 86 further includes a hook portion 94 for retainingly engaging the laterally extending portion 12c of right rudder pedal 12. The hook portion 94 of the rudder pedal retaining member 86 has a substantially U-shaped configuration defining a lever receiving space 96. The lever receiving space 96 is sized to retainingly receive the laterally extending portion 12c of the rudder pedal 12, substantially as shown in FIG. 3. The hook portion 94 is formed on the rudder pedal retaining member 86 so that a centerline 98 extending from the open end of the hook portion 96 extends downwardly from the longitudinal axis of the rudder pedal retaining member 84 and generally toward the first end 92 of the rudder pedal retaining member 86 so that control wheel retaining members 34a and 34b and the hook portion 94 are oriented in substantially opposing directions when the control wheel support assembly 26 and the rudder pedal support assembly 28 are assembled.

Like the rudder pedal retaining assembly 58a, the rudder pedal retaining assembly 58b includes an insert tube 100 and a rudder pedal retaining member 102. The insert tube 100 is constructed of a square tube sized so that the insert tube 100 is slidingly received in the second open end 78 of the rudder cross bar 56 in a telescoping relationship therewith. The insert tube 100 is characterized as having a first end 104 and a second end 106.

The rudder pedal retaining member 102 is constructed of a relatively flat steel bar having a first end 108 connected to the first end 104 of the insert tube 100 so that the rudder pedal retaining member 102 is normally disposed relative to the insert tube 100 and so that the rudder pedal retaining member 102 will extend upwardly from the longitudinal axis of the support rod 54 at the angle 64 when the rudder pedal retaining member 102 is disposed in the insert tube 100. The rudder pedal retaining member 102 further includes a hook portion 110 for retainingly engaging the laterally extending portion 12c of the left rudder pedal 12. The hook portion 110 of the rudder pedal retaining member 102 has a substantially U-shaped configuration defining a lever receiving space 112. The lever receiving space 112 is sized to retainingly receive the laterally extending portion 12c of the rudder pedal 12. The hook portion 110 is formed on the rudder pedal retaining member 102 such that the centerline extending from the open end of the hook portion 110 extends downwardly from the longitudinal axis of the rudder pedal retaining member 102 and generally toward the first end 108 of the rudder pedal retaining member 102 so that control wheel retaining members 34a and 34b and the hook portion 110 are oriented in substantially opposing directions when the control wheel support assembly 26 and the rudder pedal support assembly 28 are assembled.

When the insert tubes 84 and 100 are disposed in the first and second open ends 76 and 78 of the cross bar 56, respectively, the rudder bar retaining members 86 and 102 extend upwardly from the longitudinal axis of the support rod 54 at the angle 64 in a spaced apart, parallel relationship. Furthermore, with the control wheel support assembly 26 assembled with the rudder pedal support assembly 28, the hook portions 94 and 110 of the rudder pedal retaining members 86 and 102, respectively, are oriented relative to the control wheel retaining members 34a and 34b so that the rudder pedal retaining members 86 and 102 cooperate with the rudder pedal retaining members 86 and 102 to secure the locking apparatus 24 on the control wheel 16 and the rudder pedals 12 when the control column 14 is in the inward position and the rudder pedals 12 are in the neutral or centered position.

OPERATION

In operation, the rudder pedal engaging assemblies 58a and 58b are adjusted so that each of the hook portions 94 and 110 are properly spaced apart to fit over the corresponding laterally extending portion 12c of the rudder pedal 12 when the extension rod 30 and the support rod 54 are generally aligned with the control column 14. With the rudder pedal retaining members 86 and 102 properly spaced, the cap screws 82 are tightened to secure the rudder pedal retaining assemblies 58a and 58b in place. Next, the hook portions 94 and 110 of the rudder pedal retaining members 86 and 102 are positioned on the respective laterally extending portions 12c of the rudder pedals 12. The control column 14 is then pushed to the inward position so as move the elevator control surfaces to a downward angled position. With the control column 14 in the inward position, the control wheel support assembly 26 is extended relative to the rudder pedal support assembly 28 so that the control wheel retaining members 34a and 34b are positioned out in front of the control wheel 16. The control wheel support assembly 26 is then retracted so as to position the control wheel retaining members 34a and 34b on the control wheel 16 such that opposing radially extending portions 20a and 20b of the control wheel 16 are positioned in the control wheel receiving spaces 52a and 52b, respectively. When the control wheel retaining members 34a and 34b are positioned on the control wheel 16 with the rudder pedal retaining members 86 and 102 positioned on the rudder pedals 12 and the control column 14 in the inward position, the control wheel support assembly 26 is secured relative to the rudder pedal support assembly 28 by tightening the clamp knob 68 against the extension rod 30 of the control wheel support assembly 26, thereby rigidly interlocking the extension rod 30 with the support rod 54 so that the control wheel retaining members 34a and 34b cooperate with the rudder pedal retaining members 86 and 102 to secure the control wheel 16 in the level position with the control column 14 in the inward position and the rudder pedals 12 in the neutral or centered position.

To enable the locking apparatus 24 to be secured on the aircraft so as to protect the aircraft against theft, a lock receiving hole 114 (FIG. 2) is formed through the extension rod 30 so that the lock receiving hole 114 is aligned with the lock receiving opening 72 of the support rod 54 when the locking apparatus 24 is secured on the control wheel 16 and the rudder pedals 12. With the locking apparatus 24 secured on the control wheel 16 and the rudder pedals 12, the shackle of the pad lock 74 is inserted through the aligned lock receiving openings 72 and 114, and the pad lock 74 is locked thereby locking the locking apparatus 24 to the control wheel 16 and the rudder pedals 12.

From the above description it is clear that the present invention is well adapted to carry out the objects and to attain the advantages mentioned herein as well as those inherent in the invention. While a presently preferred embodiment of the invention has been described for purposes of this disclosure, it will be understood that numerous changes may be made which will readily suggest themselves to those skilled in the art and which are accomplished within the spirit of the invention disclosed and as defined in the appended claims.

What is claimed:

1. An apparatus for rigidly interlocking a control wheel and a pair of rudder pedals of an aircraft to secure the control surfaces of the aircraft operated by the control wheel and the rudder levers in a stable position, the control wheel connected to a control column for rotating the control column about a longitudinal axis thereof to operate the aileron control surfaces of the aircraft between a level position, a right bank position, and a left bank position and for moving the control column between an inward position and an outward position along the longitudinal axis to operate the elevator control surfaces of the aircraft, each of the rudder pedals having a lever movable between a neutral position and a depressed position to operate the rudder control surface of the aircraft, the apparatus comprising:

a first rod member having a first end and a second end;

a second rod member having a first end and a second end, the second rod member disposed in a telescoping relationship with respect to the first rod member;

control wheel retaining means rigidly connected to the first end of the second rod member for retainingly engaging a portion of the control wheel;

rudder pedal lever retaining means rigidly connected to the second end of the first rod member for retainingly engaging each of the rudder levers; and securing means for rigidly securing the first rod member relative to the second rod member whereby the control wheel retaining means is rigidly locked in a selected position relative to the rudder pedal retaining means wherein the control wheel retaining means cooperates with the rudder pedal retaining means to secure the control wheel in the level position, the control column in the inward position, and the rudder pedals in the neutral position.

2. The apparatus of claim 1 wherein the first rod member has a noncircular configuration, and wherein the second rod member is slidingly matable with the first rod member.

3. The apparatus of claim 1 wherein the control wheel control means comprises:

a pair of control wheel retaining members rigidly connected to the first end of the second rod member in a spaced apart relationship with one another, each of the control wheel retaining members configured to retainingly engage opposing radially extending portions of the control wheel.

4. The apparatus of claim 3 wherein each of the control wheel retaining members has a generally U-shaped configuration.

5. The apparatus of claim 1 wherein the rudder pedal retaining means comprises:

a pair of rudder pedal retaining members rigidly connected to the second end of the first rod member in a spaced apart, parallel relationship with one another, each of the rudder pedal retaining members configured to retainingly engage the lever of one of the rudder pedals.

6. The apparatus of claim 5 wherein the space between the rudder pedal retaining members is selectively adjustable.

7. The apparatus of claim 6 wherein each of the rudder pedal retaining members is slidable along a line normal to a longitudinal axis of the first and second rod members.

8. An apparatus for rigidly interlocking a control wheel and a pair of rudder pedals of an aircraft to secure the control surfaces of the aircraft operated by the control wheel and the rudder pedals in a stable position, the control wheel connected to a control column for rotating the control column about a longitudinal axis thereof to operate the aileron control surfaces of the aircraft between a level position, a right bank position, and a left bank position and for moving the control column between an inward position and an outward position along the longitudinal axis to operate the elevator control surfaces of the aircraft, each of the rudder pedals having a lever movable between a neutral position and a depressed position to operate the rudder control surface of the aircraft, the apparatus comprising:

a first rod member having a first end and a second end;

a second rod member having a first end and a second end, the second rod member disposed in a telescoping relationship with respect to the first rod member;

a pair of control wheel retaining members rigidly connected to the first end of the second rod member in a spaced apart relationship with one another, each of the control wheel retaining members configured to retainingly engage opposing radially extending portions of the control wheel;

a pair of rudder pedal retaining members rigidly connected to the second end of the first rod member in a spaced apart, parallel relationship with one another, each of the rudder pedal retaining members configured to retainingly engage the lever of one of the rudder pedals; and securing means for rigidly securing the first rod member relative to the second rod member whereby the control wheel retaining members are rigidly locked in a selected position relative to the rudder pedal retaining members wherein the control wheel retaining members cooperate with the rudder pedal retaining members to secure the control wheel in the level position, the control column in the inward position, and the rudder pedals in the neutral position.

9. The apparatus of claim 8 wherein the first rod member has a noncircular configuration, and wherein the second rod member is slidingly matable with the first rod member.

10. The apparatus of claim 8 wherein each of the control wheel retaining members has a generally U-shaped configuration.

11. The apparatus of claim 8 wherein the space between the rudder pedal retaining members is selectively adjustable.

12. The apparatus of claim 11 wherein each of the rudder pedal retaining members is slidable along a line normal to a longitudinal axis of the first and second rod members.

13. An apparatus for rigidly interlocking a control wheel and a pair of rudder pedals of an aircraft to secure the control surfaces of the aircraft operated by the control wheel and the rudder pedals in a stable position, the control wheel connected to a control column for rotating the control column about a longitudinal axis thereof to operate the aileron control surfaces of the aircraft between a level position, a right bank position and a left bank position and for moving the control column between an inward position and an outward position along the longitudinal axis to operate the elevator control surfaces of the aircraft, each of the rudder pedals having a lever movable between a neutral position and a depressed position to operate the rudder control surface of the aircraft, the apparatus comprising:

a first rod member having a first end and a second end;

a second rod member having a first end and a second member, the first rod member disposed in the second rod member in a telescoping relationship;

a control wheel cross bar having a first end portion, a second end portion, and a medial portion, the control wheel cross bar connected to the first end of the second rod member at the medial portion of the cross bar such that the first and second end portions of the control wheel cross bar extend outwardly from the first end of the second rod member;

a first control wheel retaining member connected to the first end portion of the control wheel cross bar, the first control wheel retaining member configured to retainingly engage a radially extending portion of the control wheel;

a second control wheel retaining member connected to the second end portion of the control wheel cross bar such that the first control wheel retaining member is in a spaced apart relationship with respect to the second control wheel retaining member, the second control wheel retaining member configured to retainingly engage an opposing portion of the control wheel;

a rudder cross bar having a first end and a second end, the rudder cross bar connected to the second end of the first rod member between the first and second ends of the rudder cross bar such that the rudder cross bar is normally disposed relative to a longitudinal axis of the first and second rod members;

a first insert tube having a first end and a second end, the first insert tube slidably disposed in the first end of the rudder cross bar;

a second insert tube having a first end and a second end, the second insert tube slidably disposed in the second end of the rudder cross bar;

means for selectively securing the first and second insert tubes to the rudder cross bar;

a first rudder pedal retaining member having a first end connected to the first end of the first insert tube in a perpendicular relationship to the first insert tube, the first rudder pedal retaining member having a hook portion for retainingly engaging the lever of one of the rudder pedals;

a second rudder pedal retaining member having a first end connected to the first end of the second insert tube in a perpendicular relationship to the second insert tube such that the second rudder pedal retaining member is in a spaced apart, parallel relationship with the first rudder pedal retaining member, the second rudder pedal retaining member having a hook portion for retainingly engaging the lever of the other rudder pedal; and securing means for rigidly securing the first rod member relative to the second rod member whereby the control wheel retaining members are rigidly locked in a selected position relative to the rudder pedal retaining members wherein the control wheel retaining members cooperate with the rudder pedal retaining members to secure the control wheel in the level position, the control column in the inward position, and the rudder pedals in the neutral position.

14. The apparatus of claim 13 wherein the first rod member has a noncircular configuration, and wherein the second rod member is slidingly matable with the first rod member.

15. The apparatus of claim 13 wherein each of the control wheel retaining members has a generally U-shaped configuration.

16. A method of securing the control surfaces of an aircraft having a control wheel connected to a control column for rotating the control column about a longitudinal axis thereof to operate the aileron control surfaces of the aircraft between a level position, a right bank position and a left bank position and for moving the control column between an inward position and an outward position along the longitudinal axis to operate the elevator control surfaces of the aircraft, the aircraft further having a pair of rudder pedals, each having a lever movable between a neutral position and a depressed position to operate the rudder control surface of the aircraft, the method comprising the steps of:

providing a pair of rudder pedal retaining members rigidly connected to a first rod member and spaced apart in a parallel relationship with one another;

providing a pair of control wheel retaining members rigidly connected to a second rod member in a spaced apart, parallel relationship with one another;

positioning the rudder pedal retaining members on the rudder pedals;

positioning the control wheel retaining members on opposing radially extending portions of the control wheel with the control column in the inward position; and rigidly interlocking the first rod member with the second rod member whereby the control wheel retaining members are rigidly locked in a selected position relative to the rudder pedal retaining members wherein the control wheel retaining members cooperate with the rudder pedal retaining members to secure the control wheel in the level position with the control column in the inward position and the rudder pedals in the neutral position.

\* \* \* \* \*